United States Patent [19]
Ellis et al.

[11] Patent Number: 5,939,031
[45] Date of Patent: *Aug. 17, 1999

[54] COUNTERCURRENT REACTOR

[75] Inventors: Edward S. Ellis, Basking Ridge;
Jeffrey W. Frederick, Morris Plains;
Ramesh Gupta, Berkeley Heights;
David C. Dankworth, Whitehouse
Station; Dimitrios M. Tsangaris,
Berkeley Heights, all of N.J.

[73] Assignee: Exxon Research and Engineering Co., Florham Park, N.J.

[ * ] Notice: This patent is subject to a terminal disclaimer.

[21] Appl. No.: 08/885,699

[22] Filed: Jun. 30, 1997

Related U.S. Application Data

[63] Continuation-in-part of application No. 08/702,334, Aug. 23, 1996.
[51] Int. Cl.[6] .............................................. B01J 8/04
[52] U.S. Cl. ......................... 422/191; 422/194; 422/195; 422/220; 422/106; 422/111; 422/112; 261/148
[58] Field of Search ............................. 422/191, 194–196, 422/220, 111–112, 106; 202/158, 163, 232; 203/29, DIG. 6; 208/142–143; 261/146–148

[56] References Cited

U.S. PATENT DOCUMENTS 4,026,674  5/1977  McDonald ............................... 422/191
5,670,116  9/1997  Gupta et al. ............................ 422/191

*Primary Examiner*—Hien Tran
*Attorney, Agent, or Firm*—Henry E. Naylor

[57] ABSTRACT

A reactor is provided for reacting a liquid with a treat gas in the presence of a catalyst, the reactor comprising a continuous wall enclosing a first reaction zone, wherein the first reaction zone includes a catalyst for causing a desired reaction between the liquid and the treat gas; a liquid inlet above the first reaction zone for allowing an unreacted portion of the liquid to enter the reactor; a gas inlet below the first reaction zone for allowing an unreacted portion of the treat gas to enter the reactor; a liquid outlet below the first reaction zone for allowing a reacted portion of the liquid to exit the reactor; a gas outlet above the first reaction zone for allowing a reacted portion of the treat gas to exit the reactor; and a liquid bypass device in the first reaction zone for allowing a portion of the liquid to bypass a portion of the first reaction zone, the liquid bypass device including a liquid bypass regulating device for regulating the amount of liquid which bypasses the first reaction zone. In a preferred embodiment, a plurality of reaction zones are present, and a liquid distribution tray is disposed above each reaction zone. Preferably, the liquid bypass device creates a hydrostatic seal with the liquid accumulating in the distribution tray so that the timing and extent of liquid bypass is self-regulating based on predefined flooding conditions.

17 Claims, 5 Drawing Sheets

COUNTERCURRENT REACTOR

CROSS REFERENCE TO RELATED APPLICATIONS

This is a continuation-in-part of U.S. Ser. No. 08/702,334; filed Aug. 23, 1996.

FIELD OF THE INVENTION

The present invention relates to a reactor for processing liquid petroleum or chemical streams wherein the stream flows countercurrent to the flow of a treat gas, such as a hydrogen-containing gas, in at least one interaction zone. The reactor contains liquid passageways to bypass one or more packed beds, preferably catalyst beds. This permits more stable and efficient vessel operation.

DESCRIPTION OF THE PRIOR ART

There is a continuing need in the petroleum refining and chemical processing industries for improved catalysts and process technology. One such process technology, hydroprocessing, has been subjected to increasing demands for improved heteroatom removal, aromatic saturation, and boiling point reduction. More active catalysts and improved reactor designs are needed to meet this demand. Countercurrent reactors have the potential of helping to meet these demands because they offer certain advantages over co-current flow reactors. Countercurrent hydroprocessing is well known, but of very limited commercial use. A countercurrent process is disclosed in U.S. Pat. No. 3,147,210 which teaches a two-stage process for the hydroprocessing-hydrogenation of high boiling aromatic hydrocarbons. The feedstock is first subjected to catalytic hydroprocessing, preferably in co-current flow with hydrogen. It is then subjected to hydrogenation over a sulfur-sensitive noble metal hydrogenation catalyst countercurrent to the flow of a hydrogen-rich gas. U.S. Pat. Nos. 3,767,562 and 3,775,291 disclose a similar process for producing jet fuels, except the jet fuel is first hydrodesulfurized prior to two-stage hydrogenation. U.S. Pat. No. 5,183,556 also discloses a two-stage concurrent-countercurrent process for hydrofining—hydrogenating aromatics in a diesel fuel stream.

An apparatus is disclosed in U.S. Pat. No. 5,449,501 that is designed for catalytic distillation. The distillation apparatus, which is a vessel, contains vapor passageways which provide a means for vapor communication between fractionation sections located above and below catalyst beds. Substantially all of the vapor in the vessel rises through the vapor passageways and the desired contacting between vapor and liquid occurs only in the fractionation sections.

While the concept of countercurrent hydroprocessing has been known for some time, countercurrent flow reactors are typically not used in the petroleum industry, primarily because conventional fixed bed reactors are susceptible to catalyst bed flooding when operated in countercurrent flow mode. That is, the relatively high velocity of the upward flowing treat gas prevents the downward flow of the liquid. The liquid thus cannot pass through the catalyst bed. While flooding is undesirable, catalyst contacting by the reactant liquid improves as the bed approaches a flooded condition. However, operating close to the point of incipient flooding leaves the process vulnerable to fluctuations in pressure or temperature or in liquid or gas flow rates. This could result in a disturbance large enough to initiate flooding, and process unit shutdown in order to recover stable operation. Such disruptions are highly undesirable in a continuous commercial operation.

One solution to the flooding problems associated with countercurrent reactors is disclosed in U.S. Ser. No. 08/702,334 by several of the inventors herein. In that reactor, one or more gas bypass tubes are disposed across the catalyst beds which allow the treat gas to bypass the reaction zone. Allowing the gas to bypass the reaction zone maintains the pressure differential across the reaction zone at a level that prevents flooding. Another solution is described in U.S. Ser. No. 08/885,788, Attorney Docket No. HEN9706, and filed on the same date as the present application, and having the same inventors herein, which includes a countercurrent reactor having a simple and effective means of regulating the amount of gas which bypasses the reaction zone. In that reactor, gas is diverted only at a time just prior to a predefined flood condition, and only to the extent necessary to maintain the catalyst bed at pre-flood levels.

Whereas the above described inventions provide solutions involving the bypass of treat gas, there still remains a need for occasional bypassing of the downward flowing liquid as well. More specifically, it would be highly advantageous to permit the bypass of liquid only to the extent necessary to: (1) overcome or prevent a predefined flood condition; (2) maintain the liquid at a selected level so that the operating flexibility of the reactor is maintained; and (3) to prevent a situation where automatic gas bypassing is so severe that it results in hydrogen starvation resulting in deactivation of catalyst. Ideally, such a liquid bypass feature should be self-actuating and could be used in conjunction with the aforementioned gas bypass techniques to establish optimum reactor conditions. These improvements should result in a countercurrent reactor which is not as readily susceptible to flooding, which can more easily recover without shutdown should flooding occur, and which allows reactor operation at pre-flood conditions.

SUMMARY OF THE INVENTION

It is therefore an object of the present invention to provide a countercurrent reactor which minimizes the occurrence of flooding.

Another object of the present invention is to provide a countercurrent reactor which more easily recovers from a flooding condition without the necessity of shutting down the reaction process.

It is also an object of the present invention to provide a countercurrent reactor which includes a liquid bypass capability which is self-regulating in terms of the timing and the amount of liquid bypassed.

Still another object of the present invention is to provide a countercurrent reactor whose liquid bypass device is simple and which requires a minimum of maintenance.

These and other objects and advantages of the present invention will no doubt become apparent to those skilled in the art after having read the following description of the preferred and alternate embodiments, which are contained in and illustrated by the various drawing figures.

Therefore, in accordance with the present invention, a reactor is provided for reacting a liquid with a treat gas in the presence of a catalyst, the reactor comprising a continuous wall enclosing a first reaction zone, wherein the first reaction zone includes a bed of catalyst for causing a desired reaction between the liquid and the treat gas; liquid inlet means above the first reaction zone for allowing a portion of the liquid to enter the reactor; gas inlet means below the first reaction zone for allowing a portion of the treat gas to enter the reactor; liquid outlet means below the first reaction zone for allowing a reacted portion of the liquid to exit the reactor; gas outlet means above the first reaction zone for allowing a portion of the treat gas to exit the reactor; and liquid bypass means in the first reaction zone for allowing a portion of the downward flowing liquid to bypass a portion of the first reaction zone, the liquid bypass means including liquid bypass regulating means for regulating the amount of liquid which bypasses the portion of the first reaction zone. The above arrangement allows the liquid and the treat gas to flow in countercurrent fashion across the catalyst bed within the reaction zone.

In a preferred embodiment, the reactor includes a plurality of reaction zones, and a liquid distribution tray is disposed above each reaction zone. The liquid bypass means comprises a conduit having a lower section and an upper section, and wherein the upper section is in fluidic communication with the liquid in the liquid distribution tray during a predefined flooding-prone condition to form a hydrostatic seal with the liquid, thereby creating a siphoning effect during the flooding-prone conditions; and the lower section extends below the first reaction zone.

Optionally, the reactor may further include at least one reaction zone disposed above the first reaction zone with some or all of the liquid feed entering the reactor above the additional reaction zone; and second gas inlet means disposed above that additional reaction zone for establishing a flow of treat gas in substantially the same direction as the flow of liquid, i.e. in a downward direction. Alternatively, or in addition, liquid feedstock can be introduced below the additional reaction zone, but above the first reaction zone, with optional additional treat gas at the same level, so that the vapor phase of the feedstock can be reacted in co-current fashion with the additional treat gas, i.e. in an upward direction through the additional reaction zone.

DETAILED DESCRIPTION OF THE INVENTION

Figure 1:
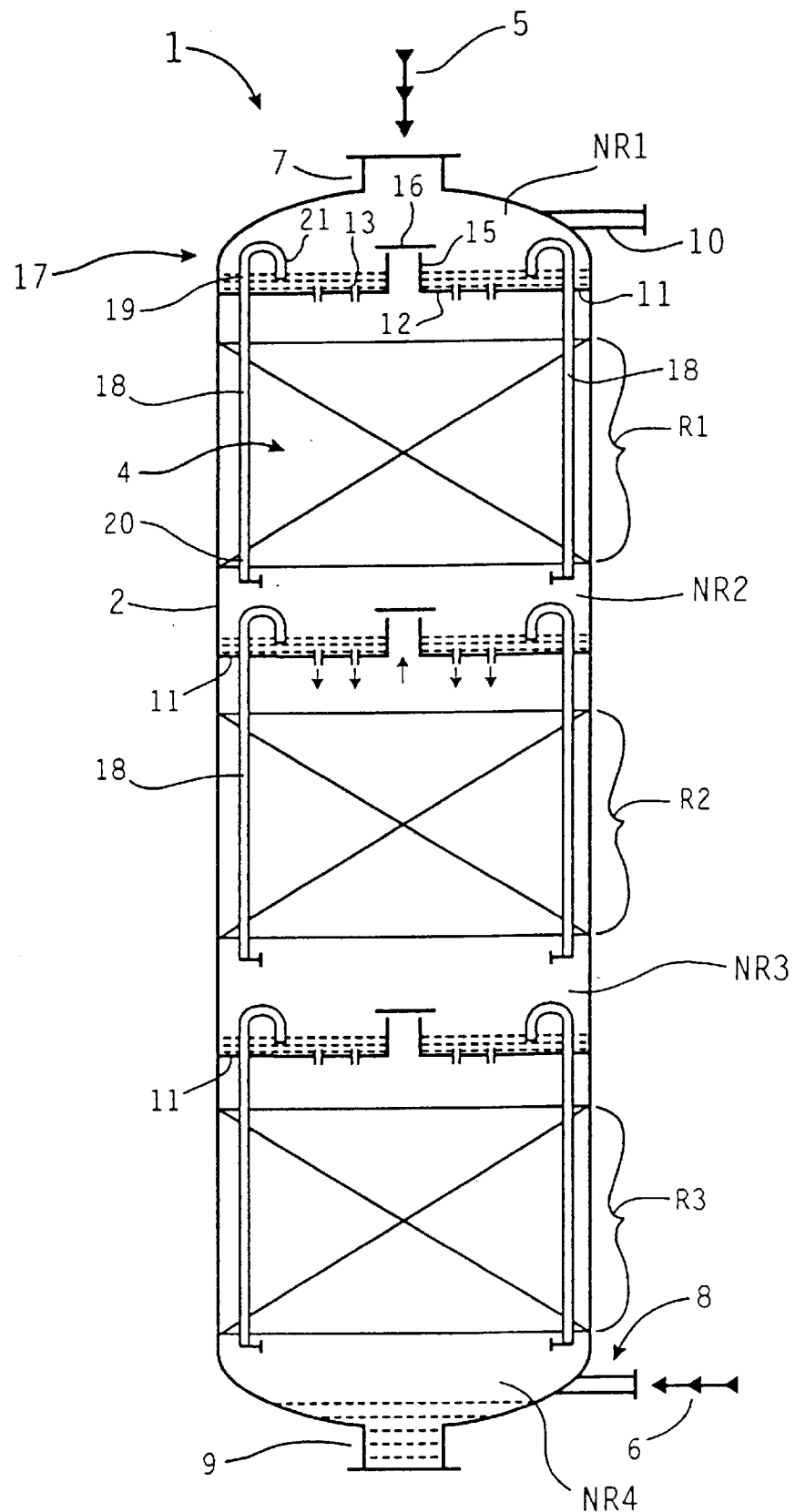
FIG. 1 is a cross-sectional view of a preferred embodiment of the present invention showing three reaction zones, each of which includes liquid bypass means disposed in an operating position with respect to the liquid distribution trays.

The reactors of the present invention are suitable for use in any petroleum or chemical process wherein it is advantageous to pass a gas, such as a hydrogen-containing treat gas, countercurrent to the flow of liquid feedstock. Non-limiting examples of refinery processes in which the instant reactors can be employed include the hydroconversion of heavy petroleum feedstocks to lower boiling products; the hydrocracking of distillate boiling range feedstocks; the hydrotreating of various petroleum feedstocks to remove heteroatoms, such as sulfur, nitrogen, and oxygen; the hydrogenation of aromatics; and the hydroisomerization and/or catalytic dewaxing of waxes, particularly Fischer-Tropsch waxes. It is preferred that the reactors of the present invention be those in which a hydrocarbon feedstock is hydrotreated and hydrogenated, more specifically when heteroatoms are removed and when at least a portion of the aromatic fraction of the feed is hydrogenated.

A brief description of the problems often seen in conventional countercurrent reactors will facilitate an understanding of the advances offered by the present invention. In countercurrent processing, the vertically upward flowing gas hinders the downward movement of the liquid. At low liquid and gas velocities, the hindrance from the slowly moving gas is not enough to cause flooding and the liquid in the reactor is able to drain through the catalyst bed in the reaction zone. However, if either the upward flowing gas rate or the downward flowing liquid rate is too high, liquid cannot drain through the catalyst bed. This is known as "flooding." The liquid holdup in the bed increases and liquid may begin to accumulate above the top surface of the catalyst bed. The upward flowing gas rate at which flooding occurs in a given bed will depend on such things as the rate and physical properties of the downward flowing liquid, as well as the size and shape of the catalyst particles. Similarly, the downward flowing liquid rate at which flooding occurs in a given bed similarly depends on the rate and properties of upward flowing gas, as well as the size and shape of the catalyst particles.

As will be explained in further detail below, the reactors of the present invention are less susceptible to flooding than conventional countercurrent reactors because of passageways, or liquid bypass means, which act to selectively bypass a fraction of the downward flowing liquid through one or more of the catalyst beds. As the rate of liquid delivery from a liquid distributor tray increases to a first predefined threshold level correlating with a near-flood condition, a fraction of downward flowing liquid is allowed to bypass one or more catalyst beds. When the liquid delivery rate subsequently falls below a second predefined threshold level, the bypassing of liquid is automatically stopped. Thus, the liquid bypass means provide a self-regulating amount of downward flowing liquid to pass to a lower reaction zone, thereby preventing flooding and extending the hydrodynamic operating window of the reactor. Such a system provides a means by which catalyst bed pressure drop, and therefore catalyst contacting efficiency, can be further controlled. The liquid which bypasses a particular catalyst bed or beds will pass through the other catalyst bed(s) and serve to take part in the desired hydroprocessing reactions.

Thus, the liquid bypass means of the present invention, especially when used in conjunction with the gas bypass techniques mentioned previously, provide an extended operating range and an opportunity to operate close to the flooding point of the reactor. This enables a more stable, more efficient reactor operating regime. Further, the reactor can safely and continuously operate while responding to normal process fluctuations in liquid and vapor flow rate and temperature. The range of total flow rates that can be tolerated is thereby extended. Operating close to the flooding point results in very efficient contacting because the catalyst particles are well irrigated by the downward flowing liquid. In the absence of the liquid bypass means, a conventional countercurrent reactor would need to operate at lower average liquid flow rates in order to remain operable.

The ability to control the bypassing of liquid allows for higher gas flow rates to be used. The higher gas flow rate capacity of the reactors of the instant invention provides flexibility to use higher quench gas rates and/or treat gas rates, enabling wider breadth of application for reactions involving high hydrogen consumption and heat release, such as aromatics saturation. Furthermore, the higher gas handling capacity enables the use of countercurrent reaction processing for reactions involving evolution of vapor phase products which might otherwise result in flooding due to excessive vapor generated during reaction, e.g., hydrocracking.

If flooding does occur, the reactors of the present invention are also more easily recovered and brought back to normal operation. During flooding, the liquid holdup in the bed may begin to accumulate. If unchecked, the liquid level may also increase on the distribution trays. This liquid backup must be drained to recover from flooding. The liquid bypass means diverts the excess liquid to the lower catalyst beds, effectively reallocating the liquid to those areas in the reactor where the required reactions can take place. Unless otherwise stated herein, the terms "downstream" and "upstream" are with respect to the flow of liquid which will flow downward.

Turning now to FIG. 1, one embodiment of a reactor 1 of the present invention is shown to generally comprise a continuous wall 2 which encloses at least one reaction zone R1 having a catalyst bed 4 suitable for causing a desired reaction between a liquid 5 and a treat gas 6. Miscellaneous reactor internals, such as thermocouples, heat transfer devices, and the like not bearing upon points of novelty are omitted from the figures for reasons of clarity. Although three such reaction zones R1, R2, R3 are shown serially disposed in FIG. 1, the number of reaction zones within any given reactor will depend upon the particular needs of the reaction, as will be explained further herein. Each reaction zone is immediately preceded and immediately followed by a non-reaction zone NR1, NR2, NR3, NR4, which may be voids or empty sections in the reactor 1. Liquid inlet means 7 is located near the top of the reactor 1 and allows an unreacted portion of the incoming liquid 5, such as a feedstock to be treated, to enter the reactor 1. Gas inlet means 8 is located near the bottom of the reactor 1 and allows an unreacted portion of the incoming treat gas 6 to enter the reactor 1. Liquid outlet means 9 is located near the bottom of the reactor 1 and allows a reacted portion of the liquid to exit the reactor 1 as a reaction product. Analogously, gas outlet means 10 is located near the top of the reactor 1 and allows a reacted portion of the gas to exit the reactor 1.

Liquid distribution means, preferably in the form of a distribution tray 11, is preferably disposed immediately above each reaction zone for uniformly distributing the downward flowing liquid 5 across reaction zones R1, R2, R3. Each tray 11 includes a bottom surface 12, capable of holding an accumulating liquid, whose periphery is in sealable contact with the vessel wall 2. A plurality of short tubes 13, each having an upper end which rises above bottom surface 12, are formed into tray 11 to allow liquid to be distributed across the immediately downstream reaction zone. The foregoing arrangement allows liquid to accumulate on the bottom surface 12 of the tray 11 until it reaches the height of the tubes 13. Only when the accumulated liquid exceeds the height of tubes 13 is the liquid uniformly distributed across the reaction zone immediately below the tray 11. One or more gas vents 15 are also formed into tray 11 to allow passage of the upward moving treat gas. Gas vent 15 includes a cover, or baffle, 16 which prevents feed or reacted liquid from upstream reaction zones from bypassing the distribution tray 11 and entering a downstream reaction zone. However, gas vent 15 may still serve as a backup liquid draining means in the event that heavy flooding conditions occur.

As shown in FIG. 1, liquid bypass means 17 is disposed across each reaction zone for allowing a portion of the liquid to bypass the reaction zone. In a preferred embodiment, liquid bypass means 17 comprises one or more liquid bypass tubes 18 each having an upper section 19 and a lower section 20. As shown in FIG. 1, two such liquid bypass tubes 18 are positioned across each reaction zone, although fewer or more may be employed. Each liquid bypass tube 18 enables fluidic communication of the liquid between two separate non-reaction zones. With reference to the uppermost reaction zone R1 in FIG. 1, the lower section 20 of both liquid bypass tubes 18 terminates in non-reaction zone NR2, while the upper section 19 of each is formed into an inverted "U" shape whose terminal end 21 is disposed a predetermined distance above the liquid distribution tray 11.

Figure 2:
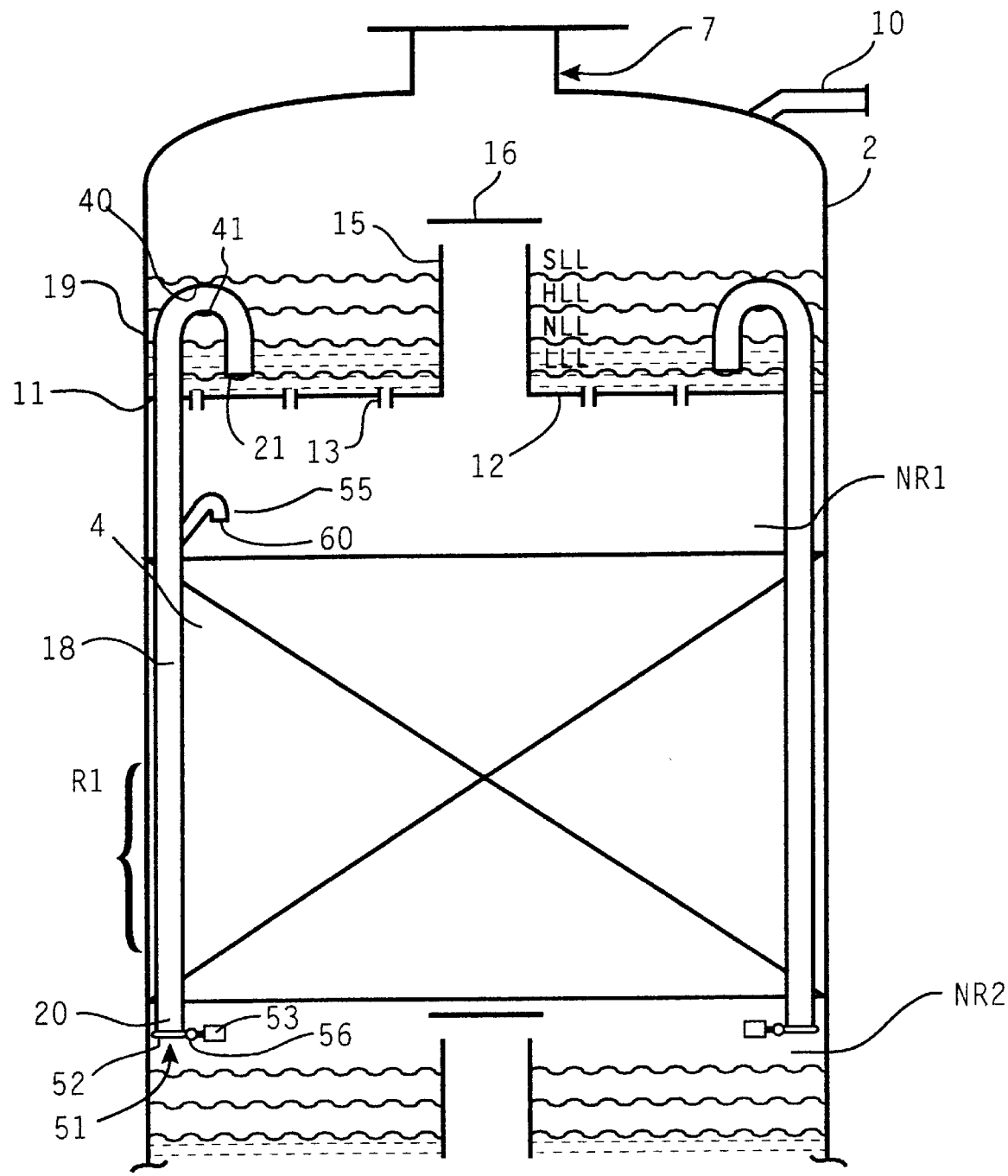
FIG. 2 depicts a detailed view of the embodiment of FIG. 1 across one of the reaction zones.

In FIG. 2, a more detailed view of the embodiment of FIG. 1 across the upper reaction zone R1 is shown. Various liquid levels are shown before, during and after a flooding event and will be further explained in conjunction with the effect of the liquid bypass tubes 18. During operation of the reactor 1, accumulating liquid in the tray 11 at the "normal liquid level" (NLL) will establish a hydrostatic seal with the terminal end 21 of the liquid bypass tube 18. Once the hydrostatic seal is created, the liquid bypass tubes 18 will not allow the bypassing of liquid until the liquid level on the liquid distribution tray 11 reaches a level which corresponds to an undesirably high rate of liquid delivery to the reaction zone R1, depicted in FIG. 2 as the "high liquid level" (HLL). The HLL corresponds to the height of the inside surface 40 of the bypass tubes 18 at which liquid will begin to be bypassed through the liquid bypass tubes 18. If the liquid entering the reactor continues to surge, or accumulate, the liquid level on the distribution tray 11 will rise higher, causing the liquid bypass tubes 18 to act as a siphon. This higher liquid level is shown in FIG. 2 as the "siphon-triggering liquid level" (SLL) and corresponds to the height of the inside surface 41 within the bypass tubes 18. As will be appreciated by one of ordinary skill, the siphoning effect will not only bypass liquid to the lower reaction zones until the liquid level on the distribution trays 11 returns to normal, but will continue to drain the distribution tray 11 of liquid to below normal levels. This post-siphoning liquid level is depicted in FIG. 2 as the "low liquid level" (LLL). During the siphoning effect of the liquid bypass tubes 18, the reduced flow rate of liquid delivered to the catalyst bed 4 prevents undesirable flooding and minimizes the probability of flow rate oscillations across the catalyst bed.

During the siphoning action of liquid bypass tubes 18, liquid flow passes to the lower end 20 where the weight of the liquid column forces a check valve 51 to open, releasing liquid to the non-reaction zone NR2 below. Check valve 51 includes a simple gravity-operated return closing mechanism enabled by a hinge 56 connecting the valve plate 52 to a counterweighted lever 53. After the liquid flow through bypass tube 18 is discontinued, valve plate 52 closes against the lower end 20 to prevent vapor from passing upward through the bypass tube 18. Thus, the upper end 19 of the bypass tube 18 is prevented from fluid communication with the vapor of non-reaction zone NR2. This is important for proper functioning of the liquid draining and siphoning action of bypass tube 18. In order to ensure that the static pressure of non-reaction zone NR2 is not communicated to the upper end 19 of the bypass tube 18, a vapor vent tube 55 extends from the side of each bypass tube 18. Vent tube 55 is located at a height above the catalyst bed 4 and below the distribution tray 11, and is of sufficient size to permit passage of any small amount of vapor which may leak through an imperfect seal of check valve 51. Thus, the static pressure inside bypass tubes 18 is approximately the same as the static pressure above the liquid on the distribution tray 11, enabling the bypass tubes 18 to respond only to changes in liquid level on the distribution tray 11. The exit port 60 of vent tube 55 faces downward to prevent downwardly flowing liquid from entering bypass tube 18 through vent tube 55. Furthermore, vent tube 55 extends upwardly from the side of bypass tube 18 to minimize the discharge of liquid through vent tube 55 during normal bypassing functions of bypass tube 18.

Although one embodiment of check valve 51 is shown in FIG. 2, check valve 51 may be employed in other equally effective embodiments known to those of ordinary skill in the art. For example, check valve 51 may be resiliently biased into a normally closed position by a spring or other similar device. Check valve 51 is preferably positioned within a normally vapor phase zone of the reactor, and the hinge 56 may be protected from splashing or otherwise undesirable contact with hydrocarbon liquids by any appropriate mechanical shielding, such as an enclosure which minimizes liquid contact. Alternatively, check valve 51 may positioned to allow continuous bathing of its components by the downwardly flowing liquid, thereby cleansing and lubricating the moving parts thereof.

Figure 3:
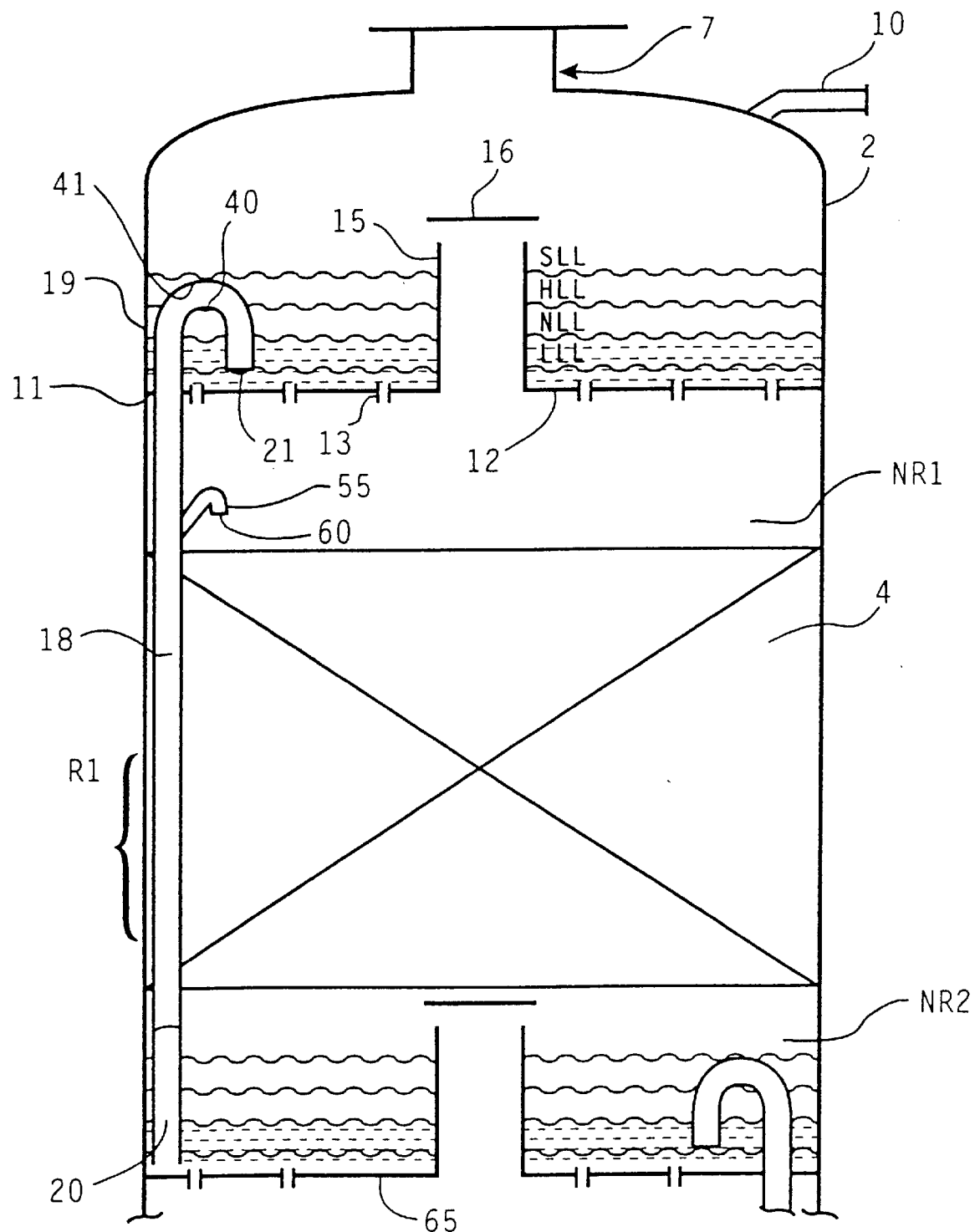
FIG. 3 is a preferred embodiment of FIG. 1 across one of the reaction zones.

A preferred embodiment of the present invention is shown in FIG. 3 hereof in a more detailed view, across the upper reaction zone R1 of FIG. 1. Some numbered features and liquid levels shown in FIG. 3, which are the same as those of FIG. 2 are not discussed because their function will be identical for both figures. FIG. 3, like FIG. 2, is a more detailed view of the embodiment of FIG. 1 across the upper reaction zone R1. During the siphoning action of liquid bypass tubes 18, liquid flow passes to the lower end 20 which is submerged in the standing liquid on distribution tray 65, which is in a non-reaction zone NR2. After liquid flow through bypass tube 18 is discontinued, the liquid level in the lower end 20 of the bypass tube returns to a level which is higher than the liquid level on tray 65, as dictated by the pressure difference between NR2 and NR1, which will typically be about 1 to 2 inches of liquid per foot of catalyst in bed 4. The vent tube 55 located above catalyst bed 4 ensures that the changes in liquid level on tray 65 or the pressure differential across bed 4 will not influence the actuation of the liquid bypass tube. The liquid seal at the bottom of bypass tube 18 prevents upward flow of vapor through the liquid bypass tube.

Figure 4:
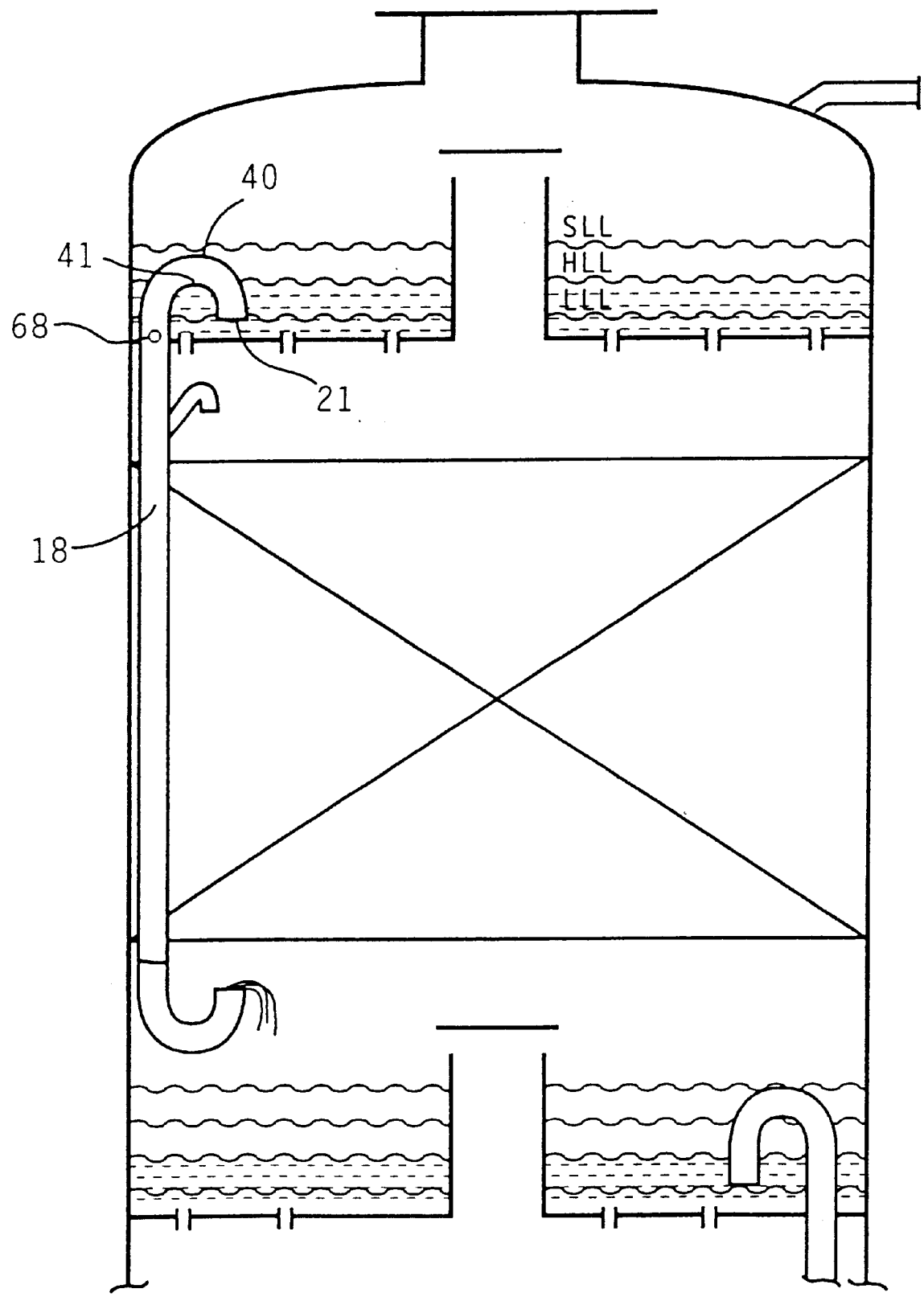
FIG. 4 is an alternative embodiment to that of FIG. 3.

FIG. 4 is an alternative embodiment to that shown in FIG. 3. All of the features of FIG. 4 are not discussed because they are identical to those of FIGS. 2 and 3, which have previously been discussed. The embodiment of FIG. 4 shows a liquid seal provided at the lower end 20 of bypass tube 18, by providing that the lower end be U-shaped. This provides a means to accumulate liquid in the bottom of tube 18 so that upward pressure flow is prevented. In order to prevent thermal degradation, e.g., polymerization or coking, of liquid in the lower end 20, an orifice 68 is located in bypass tube 18 so that a substantially continuous flow of liquid through the bypass tube is maintained. The orifice is preferably located at a level below the low liquid level LLL, but above the top surface of distribution tray 11.

As the siphoning continues, the decrease of flow to a below-normal level across the reaction zone will, of course, be temporary as the siphoning effect is ultimately arrested by the reduction of liquid level on the tray 11 to below the terminal end 21 of bypass tube 18. As the suction is broken, the level of liquid in the tray 11 returns to its normal level during a gradual return of the reactor to normal flow rates across the catalyst beds 4.

Based on known flooding conditions, a number of physical parameters will factor into the particular design employed. Such parameters are the inner diameter of the liquid bypass tubes 18, the level of the terminal end 21, the height 41 of the SLL, the height 40 of the HLL, the height of the liquid accumulating within the tray 11, and the number of liquid bypass tubes 18 to be used across each reaction zone. The desired rate of stabilization of the reactor and the pressure exerted by the upward flowing treat gas must also be taken into account in establishing the particular dimensions of the bypass tubes 18. One of ordinary skill in the field will appreciate that the exact dimensions of the tubes, as well as the number of such tubes to employ, will vary according to the needs of the situation. With a thorough understanding of the principles set forth herein, such calculations can be readily made for each reactor which is to employ the bypass tubes 18 described herein.

The foregoing design allows much flexibility in achieving responsiveness to flooding events and ensuring optimum operating conditions. For example, in the event that any particular liquid bypass tube 18 is designed to allow liquid bypass during small surges, then liquid will be allowed to bypass the reaction zone R1 only through that particular liquid bypass tube 18. This effect could be achieved by lowering the upper end 19 so that liquid can be bypassed at relatively low liquid levels. Other liquid bypass tubes 18 with higher upper ends 19 across the same reaction zone R1 would not allow bypass in response to such smaller surge events. Thus, it can be seen that an array of liquid bypass tubes 18 may optionally be positioned across any given reaction zone, wherein some liquid bypass tubes 18 will yield to greater or lesser surges than others, resulting in the ability to bypass liquid in stages. Similarly, the difference between height 40 and height 41 may be greater for some tubes than others, manifested by larger tube diameters at the uppermost portion of upper ends 19. Therefore, during surges the minimum amount of liquid will be bypassed, and the amount of bypassing can gradually change as needed. This arrangement provides the opportunity to fine tune the bypassing of liquid across a range of surge intensities, enabling the reactor 1 to stabilize more quickly after the surge and allowing it to operate with greater efficiency.

Figure 5:
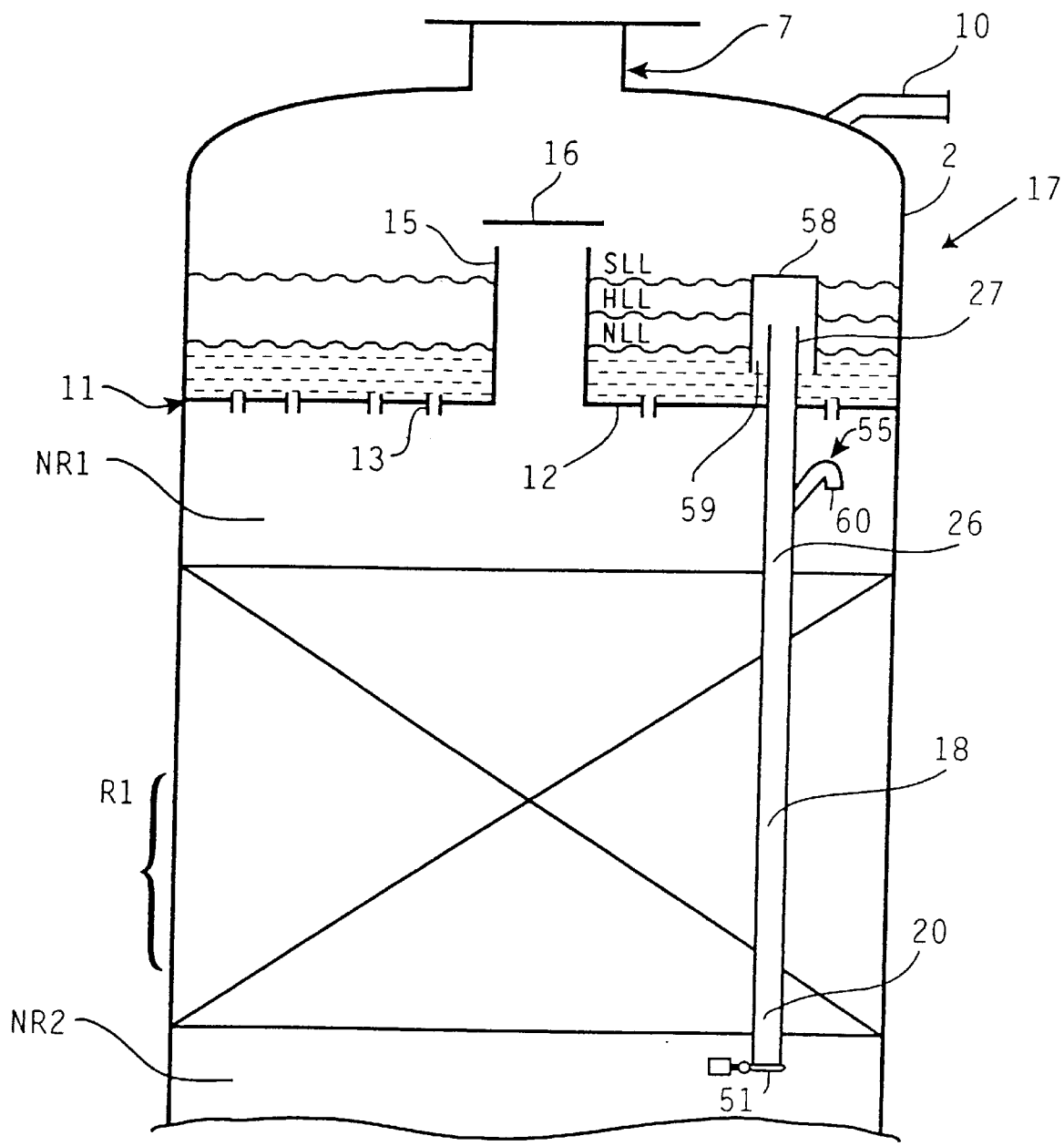
FIG. 5 depicts an alternative embodiment of the liquid bypass means.

Referring now to FIG. 5, an alternate embodiment of the invention is shown wherein the inverted "U" upper sections 19 of the liquid bypass means 17 are omitted in favor of a cap 58 positioned over a straight tube 26. Cap 58 resides over the terminal end 27 of the straight tube 26 and includes a bottom opening 59. In this embodiment, actuation of the siphon is essentially the same as in the prior embodiment. The precise point at which liquid is bypassed and siphoned can be controlled by adjusting the height of cap 58, the height of terminal end 27, and/or by increasing the length of cap 58. A vent tube 55 and check valve 51, both previously described, are also employed in this embodiment.

Although the aforedescribed embodiments of liquid bypass means 17 employ a hydrostatic seal and a siphoning effect, a multitude of alternative devices may be employed which should accomplish the same or similar result. For example, any device sensitive to liquid flow which allows the opening and closing of a valve anywhere within bypass tubes 18 below tray 11 would also be capable of enabling the liquid surge protection to actuate independent of reactor pressure changes.

As indicated earlier herein, the reactor 1 is operated by introducing the liquid feedstock 5 to be treated into liquid inlet means 7. A suitable treat gas 6, such as a hydrogen-containing gas, is introduced via gas inlet means 8 into the reactor 1 countercurrent to the downward flow of the liquid feedstock 5. It is to be understood that the treat gas need not be introduced solely at the bottom of the reactor at gas inlet means 8, but may also be introduced into any one or more of the non-reaction zones NR1, NR2, NR3, NR4. Treat gas can also be injected into any one or more of the catalyst beds in reaction zones R1, R2, R3. An advantage of introducing treat gas at various points in the reactor is to control the temperature within the reactor. For example, cold treat gas can be injected into the reactor at various points to moderate any exothermic heat of reaction. It is also within the scope of this invention that all of the treat gas can be introduced at any one of the aforesaid points as long as at least a portion of it flows countercurrent to the flow of liquid in at least one reaction zone.

The reactors used in the practice of the present invention are operated at suitable temperatures and pressures for the desired reaction. For example, typical hydroprocessing temperatures will range from about 40° C. to about 450° C. at pressures from about 50 psig to about 3,000 psig, preferably 50 to 2,500 psig. The liquid feedstock initially passes downward through the catalyst bed of reaction zone R1 where it reacts with the treat gas on the catalyst surface. Any resulting vapor-phase reaction products are swept upwards by the upward-flowing treat gas. Such vapor-phase reaction products may include relatively low boiling hydrocarbons and heteroatom components, such as $H_2S$ and $NH_3$. Any unreacted feedstock, as well as liquid reaction product, pass downwardly through each successive catalyst bed of each successive reaction zone R2 and R3.

The liquid bypass tubes 18 may be constructed from any material that can withstand the operating conditions of the reactor. Suitable materials include metals, such as stainless and carbon steels; ceramic materials; as well as high performance composite materials such as carbon fiber materials. Preferred are tubular passageways having round cross sections. The tubes need not be perfectly vertical. That is, they can be inclined or curved, or even in the form of a spiral. It is to be understood that the tubes can be of any suitable size depending on the amount and rate of liquid one wishes to bypass from one non-reaction zone to another. Also, any of the liquid bypass tubes can be extended to allow bypass through more than one reaction zone. One or more of the liquid bypass tubes may extend through all the downstream reaction zones so that some of the liquid can be withdrawn from the reactor without further contact with either the catalyst or the upward flowing treat gas. When a plurality of liquid bypass tubes are used, it is preferred that they be concentrically located about the vertical axis of the reactor.

It is possible that one or more co-current reaction zones be upstream of one or more countercurrent reaction zones. For example, liquid feedstock can be introduced between two reaction zones such that the liquid phase of the feedstock flows downward into a downstream reaction zone, while the vapor phase of the feedstock flows upward through an upstream reaction zone. In connection with the upward flow of the vapor phase of the feedstock, additional treat gas can be introduced at the same level as the feedstock so that the treat gas will flow upward into the upstream reaction zone, co-current with the vapor phase of the feedstock. Consequently, the liquid feedstock will react in the lower reaction zones in countercurrent fashion with the treat gas introduced downstream of the reaction zones. The zones, regardless of flow direction, can be in separate vessels or two or more zones can be in the same vessel. However, it is preferred that all countercurrent zones be in the same vessel.

The practice of the present invention is applicable to all liquid-vapor countercurrent refinery and chemical processing systems. Feedstocks suitable for use in such systems include those in the naphtha boiling range as well as heavier feedstocks, such as mid-distillates, gas oils and resids. Typically, the boiling range will be from about 40° C. to about 1000° C. Non-limiting examples of such feeds which can be used in the practice of the present invention include vacuum resid, atmospheric resid, vacuum gas oil (VGO), atmospheric gas oil (AGO), heavy atmospheric gas oil (HAGO), steam cracked gas oil (SCGO), deasphalted oil (DAO), and light cat cycle oil (LCCO).

Some feedstocks treated by the practice of the present invention may contain high levels of heteroatoms, such as sulfur and nitrogen. In such cases, it may be preferred that the first reaction zone be one in which the liquid feedstream flows co-current with a stream of hydrogen-containing treat gas downward through a fixed-bed of suitable hydrotreating catalyst. The term "hydrotreating" as used herein refers to processes wherein a hydrogen-containing treat gas is used in the presence of a catalyst which is primarily active for the removal of heteroatoms, such as sulfur, and nitrogen with some hydrogenation of aromatics. The term "hydroprocessing" includes hydrotreating, but also includes processes which are primarily active toward the hydrogenation, hydrocracking, and hydroisomerization. Ring-opening, particularly of naphthenic rings, for purposes of this invention can also be included in the term "hydroprocessing". Suitable hydrotreating catalysts for use in the present invention are any conventional hydrotreating catalyst and includes those which are comprised of at least one Group VIII metal, preferably Fe, Co and Ni, more preferably Co and/or Ni; and at least one Group VI metal, preferably Mo or W, more preferably Mo, on a high surface area support material, preferably alumina. Other suitable hydrotreating catalysts include zeolitic catalysts, as well as noble metal catalysts where the noble metal is selected from Pd and Pt. It is within the scope of the present invention that more than one type of hydrotreating catalyst be used in the same reactor. The Group VIII metal is typically present in an amount ranging from about 2 to 20 wt. %, preferably from about 4 to 12 wt. %. The Group VI metal will typically be present in an amount ranging from about 5 to 50 wt. %, preferably from about 10 to 40 wt. %, and more preferably from about 20 to 30 wt. %. All metals weight percents are on support. By "on support" we mean that the percents are based on the weight of the support. For example, if the support were to weigh 100 g. then 20 wt. % Group VIII metal would mean that 20 g. of Group VIII metal was on the support. Typical hydrotreating temperatures range from about 100° C. to about 430° C. with pressures from about 50 psig to about 3,000 psig, preferably from about 50 psig to about 2,500 psig. If the feedstock contains relatively low levels of heteroatoms, then the hydrotreating step may be eliminated and the feedstock passed directly to an aromatic saturation, hydrocracking, and/or ring-opening reaction zone.

For purposes of hydroprocessing, the term "hydrogen-containing treat gas" means a treat gas stream containing at least an effective amount of hydrogen for the intended reaction. The treat gas stream introduced to the reactor will preferably contain at least about 50 vol. %, more preferably at least about 75 vol. % hydrogen. It is preferred that the hydrogen-containing treat gas be make-up hydrogen-rich gas, preferably hydrogen.

In the case where the first reaction zone is a co-current hydrotreating reaction zone, the liquid effluent from said hydrotreating reaction zone will be passed to at least one downstream reaction zone where the liquid is passed through a bed of catalyst countercurrent to the flow of upward flowing hydrogen-containing treat-gas. Depending on the nature of the feedstock and the desired level of upgrading, more than one reaction zone may be needed. The most desirable reaction products resulting from hydroprocesssing, preferably when gas oils are the feedstocks, are those containing reduced levels of sulfur and nitrogen. Product streams containing paraffins, especially linear paraffins, are often preferred over naphthenes, which are often preferred over aromatics. To achieve this, at least one downstream catalyst will be selected from the group consisting of hydrotreating catalysts, hydrocracking catalysts, aromatic saturation catalysts, and ring-opening catalysts. If it is economically feasible to produce a product stream with high levels of paraffins, then the downstream zones will preferably include an aromatic saturation zone and a ring-opening zone.

If one of the downstream reaction zones is a hydrocracking zone, the catalyst can be any suitable conventional hydrocracking catalyst. Typical hydrocracking catalysts are described in U.S. Pat. No. 4,921,595 to UOP, which is incorporated herein by reference. Such catalysts are typically comprised of a Group VIII metal hydrogenating component on a zeolite cracking base. The zeolite cracking bases are sometimes referred to in the art as molecular sieves, and are generally composed of silica, alumina, and one or more exchangeable cations such as sodium, magnesium, calcium, rare earth metals, etc. They are further characterized by crystal pores of relatively uniform diameter between about 4 and 12 Angstroms. It is preferred to use zeolites having a relatively high silica/alumina mole ratio greater than about 3, preferably greater than about 6. Suitable zeolites found in nature include mordenite, clinoptiliolite, ferrierite, dachiardite, chabazite, erionite, and faujasite. Suitable synthetic zeolites include the Beta, X, Y, and L crystal types, e.g., synthetic faujasite, mordenite, ZSM-5, MCM-22 and the larger pore varieties of the ZSM and MCM series. A particularly preferred zeolite is any member of the faujasite family, see Tracy et al. Proc. of the Royal Soc., 1996, Vol. 452, p. 813. It is to be understood that these zeolites may include demetallated zeolites which are understood to include significant pore volume in the mesopore range, i.e., 20 to 500 Angstroms. Non-limiting examples of Group VIII metals which may be used on the hydrocracking catalysts include iron, cobalt, nickel, ruthenium, rhodium, palladium, osmium, iridium, and platinum. Preferred are platinum and palladium, with platinum being more preferred. The amount of Group VIII metal will range from about 0.05 wt. % to 30 wt. %, based on the total weight of the catalyst. If the metal is a Group VIII noble metal, it is preferred to use about 0.05 to about 2 wt. %. If the Group VIII metal is not a noble metal, then a preferred formulation would also include a Group VI metal in proportion similar to that mentioned above for the hydrotreating catalysts. Hydrocracking conditions include temperatures from about 200° C. to 425° C., preferably from about 220° C. to 330° C., more preferably from about 245° C. to 315° C.; pressure of about 200 psig to about 3,000 psig; and liquid hourly space velocity from about 0.5 to 10 V/V/Hr, preferably from about 1 to 5 V/V/Hr.

Non-limiting examples of aromatic hydrogenation catalysts include nickel, cobalt-molybdenum, nickel-molybdenum, and nickel tungsten. Non-limiting examples of noble metal catalysts include those based on platinum and/or palladium, which is preferably supported on a suitable support material, typically a refractory oxide material such as alumina, silica, alumina-silica, kieselguhr, diatomaceous earth, magnesia, and zirconia. Zeolitic supports can also be used. Such catalysts are typically susceptible to sulfur and nitrogen poisoning. The aromatic saturation zone is preferably operated at a temperature from about 40° C. to about 400° C., more preferably from about 260° C. to about 350° C., at a pressure from about 100 psig to about 3,000 psig, preferably from about 200 psig to about 1,200 psig, and at a liquid hourly space velocity (LHSV) of from about 0.3 V/V/Hr. to about 2.0 V/V/Hr.

The liquid phase in the reactors used in the present invention will typically be the higher boiling point components of the feed. The vapor phase will typically be a mixture of hydrogen-containing treat gas, heteroatom impurities, and vaporized lower-boiling components in the fresh feed, as well as light products of hydroprocessing reactions. The vapor phase in the catalyst bed of a countercurrent reaction zone will be swept upward with the upward flowing hydrogen-containing treat-gas and collected, fractionated, or passed along for further processing. If the vapor phase effluent still requires further hydroprocessing, it can be passed to a vapor phase reaction zone containing additional hydroprocessing catalyst and subjected to suitable hydroprocessing conditions for further reaction. It is to be understood that all reaction zones can either be in the same vessel separated by non-reaction zones, or any can be in separate vessels. The non-reaction zones in the later case will typically be the transfer lines leading from one vessel to another. It is also within the scope of the present invention that a feedstock which already contains adequately low levels of heteroatoms be fed directly into a countercurrent hydroprocessing reaction zone for aromatic saturation and/or cracking. If a preprocessing step is performed to reduce the level of heteroatoms, the vapor and liquid can be disengaged and the liquid effluent directed to the top of a countercurrent reactor. The vapor from the preprocessing step can be processed separately or combined with the vapor phase product from the reactor of the present invention. The vapor phase product(s) may undergo further vapor phase hydroprocessing if greater reduction in heteroatom and aromatic species is desired or sent directly to a recovery system.

In an embodiment of the present invention described earlier herein, the feedstock can be introduced into a first reaction zone co-current to the flow of hydrogen-containing treat gas. A vapor phase effluent fraction can then be separated from the liquid phase effluent fraction between reaction zones, e.g. in a non-reaction zone. The vapor phase effluent can be passed to additional hydrotreating, or collected, or further fractionated. The liquid phase effluent will then be passed to the next downstream reaction zone, which will preferably be a countercurrent reaction zone. In other embodiments of the present invention, vapor phase effluent and/or treat gas can be withdrawn or injected between any reaction zones.

The countercurrent contacting of liquid from an upstream reaction zone with upflowing treat gas strips dissolved $H_2S$ and $NH_3$ impurities from the effluent stream, thereby improving both the hydrogen partial pressure and the catalyst performance. The resulting final liquid product will contain a substantially lower level of heteroatoms and substantially more hydrogen then the original feedstock. This liquid product stream may be sent to downstream hydroprocessing or conversion processes.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A reactor for reacting a liquid with a treat gas in the presence of a catalyst, said reactor comprising:
   (a) a continuous wall enclosing a first reaction zone, wherein said first reaction zone includes catalyst means for causing a reaction between said liquid and said treat gas;
   (b) liquid inlet means above said first reaction zone for allowing an unreacted portion of said liquid to enter said reactor;
   (c) gas inlet means below said first reaction zone for allowing an unreacted portion of said treat gas to enter said reactor;
   (d) liquid outlet means below said first reaction zone for allowing a reacted portion of said liquid to exit said reactor;
   (e) gas outlet means above said first reaction zone for allowing a reacted portion of said treat gas to exit said reactor;
   (f) a distribution tray immediately above said first reaction zone for distributing said liquid to said first reaction zone; and
   (g) liquid bypass means in said first reaction zone for allowing a portion of said liquid to bypass a portion of said first reaction zone, said liquid bypass means including liquid bypass regulating means for regulating the amount of said liquid which bypasses said portion of said first reaction zone, said bypass means comprising a conduit having a lower section and an upper section and wherein: (aa) said upper section is in fluidic communication with said liquid in said distribution tray during a predetermined flood condition to form a hydrostatic seal with said liquid accumulating in said liquid distribution tray: (bb) said lower section extending beyond the first reaction zone; and said lower section terminating with a means of preventing upward passing vapor through said bypass means.

2. The reactor of claim 1, wherein said reactor includes a plurality of said first reaction zones.

3. The reactor of claim 2, wherein each of said first reaction zones includes said liquid bypass means.

4. The reactor or claim 1, further comprising:
   (a) a second reaction zone disposed above said first reaction zone; and
   (b) an additional gas inlet means disposed above said second reaction zone for establishing a flow of said treat gas in substantially the same direction as the flow of said liquid.

5. The reactor of claim 1, wherein said upper section is formed into an inverted "U" shape whose terminal end is disposed above said liquid distribution tray.

6. The reactor of claim 1, wherein said upper section includes an upwardly extending terminal end and a cap disposed over said terminal end, wherein said cap includes a bottom opening below said terminal end.

7. The reactor of claim 2, wherein said liquid bypass means allows said liquid to bypass two or more consecutive reaction zones.

8. The reactor of claim 1 wherein the means for preventing upward passage of vapor is a mechanical means.

9. A reactor for reacting a liquid with a treat gas in the presence of a catalyst, said reactor comprising:
   (a) a continuous wall enclosing a first reaction zone, wherein said first reaction zone includes a catalyst adapted to cause a reaction between said liquid and said treat gas;
   (b) a liquid inlet above said first reaction zone for allowing an unreacted portion of said liquid to enter said reactor;
   (c) a gas inlet below said first reaction zone for allowing an unreacted portion of said treat gas to enter said reactor;
   (d) a liquid outlet below said first reaction zone for allowing a reacted portion of said liquid to exit said reactor;
   (e) a gas outlet above said first reaction zone for allowing a reacted portion of said treat gas to exit said reactor; and
   (f) a distribution tray immediately above said first reaction zone for distributing said liquid to said first reaction zone; and
   (g) at least one liquid bypass tube in said first reaction zone adapted to allow a portion of said liquid to bypass a portion of said first reaction zone, said liquid bypass tube including liquid bypass regulator capable of regulating the amount of said liquid which bypasses said portion of said first reaction zone, said bypass tube comprising a conduit having a lower section and an upper section and wherein: (aa) said upper section is in fluidic communication with said liquid in said distribution tray during a predetermined flood condition to form a hydrostatic seal with said liquid accumulating in said liquid distribution tray: (bb) said lower section extending beyond the first reaction zone; and said lower section terminating with a means of preventing upward passing vapor through said bypass means.

10. The reactor of claim 9, wherein said reactor includes a plurality of said first reaction zones.

11. The reactor of claim 10, wherein each of said first reaction zones includes at least one said liquid bypass tube.

12. The reactor of claim 9, further comprising:
   (a) a second reaction zone disposed above said first reaction zone; and
   (b) an additional gas inlet disposed above said second reaction zone for establishing a flow of said treat gas in substantially the same direction as the flow of said liquid.

13. The reactor of claim 9, wherein said liquid bypass tube allows said portion of said liquid to completely bypass said first reaction zone.

14. The reactor of claim 9, wherein said upper section is formed into an inverted "U" shape whose terminal end is disposed above said liquid distribution tray.

15. The reactor of claim 9, wherein said upper section includes an upwardly extending terminal end and a cap disposed over said terminal end, wherein said cap includes a bottom opening below said terminal end.

16. The reactor of claim 10, wherein said liquid bypass tube allows said liquid to bypass two or more consecutive reaction zones.

17. The reactor of claim 9 wherein the means for preventing upward passage of vapor is a mechanical means.

* * * * *